United States Patent [19]

Anseau et al.

[11] Patent Number: 5,023,216
[45] Date of Patent: * Jun. 11, 1991

[54] CERAMIC MATERIAL

[75] Inventors: Michael R. Anseau, Coimbra, Portugal; James M. Lawson, Greenford; Shaun Slasor, Tyne-Wear, both of United Kingdom

[73] Assignee: Cookson Group PLC, London, United Kingdom

[*] Notice: The portion of the term of this patent subsequent to Feb. 14, 2006 has been disclaimed.

[21] Appl. No.: 303,652
[22] PCT Filed: May 20, 1988
[86] PCT No.: PCT/GB88/00398
  § 371 Date: Mar. 22, 1989
  § 102(e) Date: Mar. 22, 1989
[87] PCT Pub. No.: WO88/09314
  PCT Pub. Date: Dec. 1, 1988

[30] Foreign Application Priority Data

May 29, 1987 [GB] United Kingdom ............... 8712683

[51] Int. Cl.$^5$ ............................................. C04B 35/58
[52] U.S. Cl. ..................................... 501/98; 501/103; 501/105

[58] Field of Search ..................... 501/98, 103, 105

[56] References Cited

U.S. PATENT DOCUMENTS

| 4,506,020 | 3/1985 | Butler et al. | 501/97 |
| 4,506,021 | 3/1985 | Jack et al. | 501/98 |
| 4,748,138 | 5/1988 | Watanabe et al. | 501/87 |
| 4,804,644 | 2/1989 | Anseau et al. | 501/98 |

FOREIGN PATENT DOCUMENTS 541823 2/1977 U.S.S.R. .

OTHER PUBLICATIONS

Sanders and Mieskowski, "Strength and Microstructure of $Si_3N_4$ Sintered with $ZrO_2$ Additions" in *Advanced Ceramic Materials*, vol. 1; No. 2, 1986, pp. 166–173.

*Primary Examiner*—Mark L. Bell
*Assistant Examiner*—Deborah Jones
*Attorney, Agent, or Firm*—Watson, Cole, Grindle & Watson

[57] ABSTRACT

A ceramic material which comprises a composite of zirconia and $O'$-/$\beta'$-sialon wherein the volume ratio of $O'$-sialon to $\beta'$-sialon is in the range of from 1:7 to 7:1, preferably from 1:3 to 3:1.

6 Claims, 5 Drawing Sheets

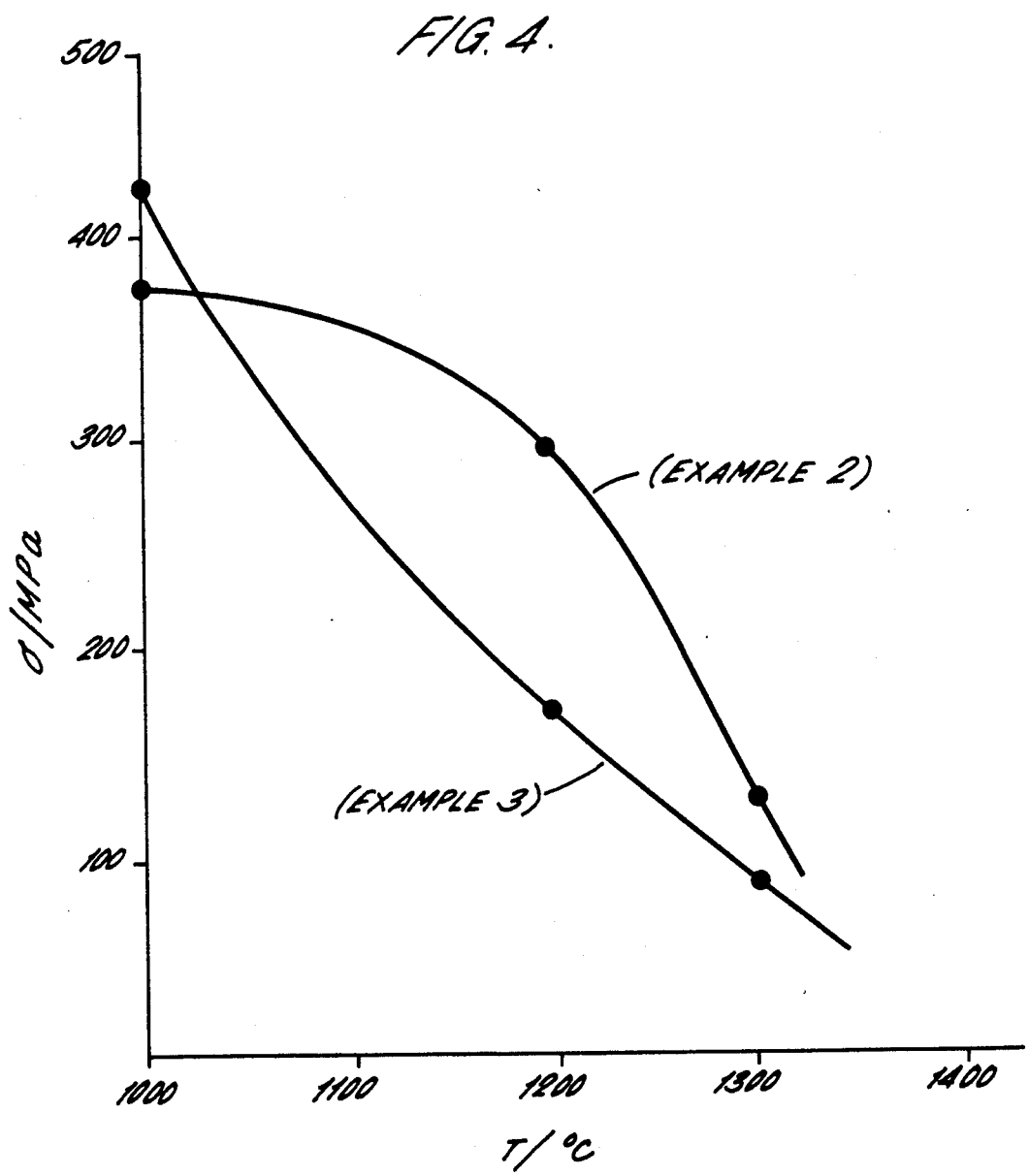

CERAMIC MATERIAL

The present invention relates to an improved ceramic material and, in particular, to an improved engineering ceramic material.

Engineering ceramics are materials such as the oxides, nitrides and carbides of the metals silicon, aluminium, boron and zirconium. They are characterized by great strength and hardness; properties which in theory can be retained to very high (>10000° C.) temperatures. Two of the most promising types of ceramic are the sialon family, and the zirconia family.

The sialons are based on the elements Si, Al, O, N, hence the acronym. A successful commercial sialon is the $\beta'$-sialon which has the $\beta$-Si$_3$N$_4$ crystal structure, but with some of the silicon atoms replaced by aluminium atoms, and for valency balance some nitrogen atoms replaced by oxygen atoms. The sialons are usually formed by mixing Si$_3$N$_4$, Al$_2$O$_3$, AlN with a metal oxide (often Y$_2$O$_3$), compacting the powder to the desired shape, and then firing the component at ~1750° C. for a few hours. The function of the metal oxide is to react with the alumina and the silica layer (which is always present on the surface of each silicon nitride particle), to form a liquid phase which dissolves the reactants and precipitates the product. The liquid phase (which still contains dissolved nitrides), cools to form a glass between the $\beta'$-sialon grains. Typically, a Y$_2$O$_3$ densified $\beta'$-sialon contains about 15 volume percent of Y-Si-Al-O-N glass and 85 volume percent $\beta'$-sialon. At temperatures above 800° C. this glass begins to soften and the strength decreases. The glass/sialon can be heat treated at ~1300° C. to crystallise the glass. In the case of $\beta'$-sialon and glass, the glass crystallises to give Y$_3$Al$_5$O$_{12}$ (yttro garnet or YAG) and a small amount of additional $\beta'$-sialon. With glass/O'-sialon the crystallisation produces Y$_2$Si$_2$O$_7$ (yttrium disilicate) plus a small amount of additional O'-sialon. This crystallisation process reduces the room temperature strength of the material, but this reduced strength is maintained to higher temperature. The reason that crystallisation reduces strength is not completely understood, but is probably because the crystalline YAG occupies a smaller volume than the glass it replaces; crystallisation leaves small cracks. The grain boundary phase is a necessary evil in these materials, it is a remnant of the densification process.

$\beta'$-Sialon has the general composition Si$_{6-z}$Al$_z$P$_z$N$_{8-z}$ where $0 < Z \leq 4.2$, whilst O'-sialon has the general composition Si$_{2-x}$Al$_x$O$_{1+x}$N$_{2-x}$ where $0 < X < 0.20$. O'-sialon has an expanded silicon oxynitride crystal lattice structure.

The $\beta'$-sialon is a strong engineering ceramic with good oxidation resistance and creep resistance up to 1300° C. The O'-sialon has approximately two thirds the strength of $\beta'$-sialon, but has very much improved oxidation resistance up to 1400° C. The two materials are in thermodynamic equilibrium and so composite materials can be formed. The high temperature creep resistance is determined by the grain boundary phase, which for these materials is usually YAG.

Another promising ceramic family is based on zirconia, ZrO$_2$. The monoclinic or tetragonal zirconia is dispersed in a matrix typically mullite, alumina or cubic zirconia. The dispersed zirconia toughens by a process known as transformation toughening. Basically, the composite is fired at high temperature (at least 1100° C.), when the ceramic densifies, and the zirconia is in its high temperature tetragonal form. On cooling, part of the tetragonal zirconia attempts (and fails) to transform to its low temperature monoclinic form. The matrix constrains the zirconia in its tetragonal form which at room temperature is metastable. This transformation would be accompanied by a 3-5 volume percent increase in each zirconia crystal. The effect is to put the entire matrix into compressive stress, rather like prestressed concrete. Any crack running into such a ceramic tends to trigger the tetragonal to monoclinic transformation which generates compressive stresses which tend to close off the crack. The process becomes more efficient, the stiffer the matrix, because the stiff matrix is better able to constrain the metastable tetragonal form at room temperature. The process is less effective at high temperature, and there is no toughening at all above 900° C. because the tetragonal zirconia is now stable not metastable. A toughening effect may also be obtained by the presence of dispersed monoclinic zirconia because of microcracking effects.

Whilst it would be desirable to attempt to zirconia toughen sialons because they are stiff (and hard and strong) but are also quite tough to start with, workers in this field have found that zirconia reacts chemically with $\beta'$-sialon and is partly reduced to zirconium oxynitrides.

We have now surprisingly found that composites of $\beta'$-sialon and zirconia have reduced amounts of stabilized cubic zirconia when O'-sialon is included therein. The present invention is based upon this discovery.

Accordingly, the present invention provides a ceramic material which comprises a composite of zirconia and O'-/$\beta'$-sialon.

The ceramic material of the invention may contain from 5 to 95 volume percent zirconia based on the total volume of the composition.

The ceramic material may comprise a dispersion of zirconia in an O'-/$\beta'$-sialon matrix and such a dispersion is obtained when the amount of zirconia is from 5 to 30 volume percent, preferably from 10 to 25 volume percent based on the total volume of the composition.

The volume ratio of O'-sialon to $\beta'$-sialon in the composites of the invention may vary between wide limits but preferably will be in the range of from 1:7 to 7:1, more preferably in the range of from 1:3 to 3:1.

The ceramic materials of the present invention may include in the O'-/$\beta'$-sialon matrix a solid solution of zirconia with yttria, ceria, lanthanum oxide, calcium oxide, magnesium oxide or a rare earth metal oxide.

The present invention furthermore provides a process for the preparation of a ceramic material as hereinbefore described which process comprises the reaction sintering at a temperature in the range of from 1500° to 1750° C. of zircon, silicon nitride and alumina or a precursor for alumina, optionally in the presence of a reaction sintering aid or a precursor therefor.

The primary function of the metal oxide sintering aid is to form a solid solution with the zirconia. Thus, the sintering aid reacts initially with the alumina and the surface layer of silica on the silicon nitride to form a transient liquid phase which dissolves the silicon nitride and the zircon and from which the zirconia and the O'-/$\beta'$-sialon precipitate.

The sintering aid used in this process may be, for example, yttria, ceria, lanthanum oxide, calcium oxide, magnesium oxide of a rare earth metal oxide, or a precursor for one of these compounds. Thus, we have found that, the alumina for the above described process and the sintering aid may be provided by the use of a spinel.

Preferred spinels for use in the process of the invention are those of magnesium or calcium with the compound of the formula $MgAl_2O_4$ being particularly preferred for use.

The spinel is incorporated into the mixture which is sintered in an amount sufficient to provide the desired amount of aluminium in the final $O'$-/$\beta'$-sialon matrix. The spinel is thus preferably used in an amount of up to 10% by weight based on the weight of the zircon and silicon nitride, preferably in an amount of from 6 to 8% by weight.

Other precursors of various of the components incorporated into the mixture reaction sintered according to the above process may also be used. Thus, the ceramic material of the invention comprising a dispersion of zirconia in an $O'$-/$\beta'$-sialon matrix may be prepared by reaction sintering a mixture of zircon, silicon nitride, a metal silicate and alumina.

The metal silicate may be, for example, a silicate of calcium, magnesium or barium. It will be appreciated that on heating to sintering temperatures the metal silicate will react with some of the zircon and silicon nitride to form a liquid phase which promotes reaction and densification by a solution-precipitation mechanism. The oxides which may be used as sintering aids may also be provided by precursors such as carbonates or bicarbonates which decompose to the oxide under the sintering conditions. For example calcium oxide and magnesium oxide as sintering aids may be provided by calcium carbonate or magnesium carbonate respectively.

We have also found that instead of using zircon ($ZrSiO_4$) in the process as described above, a mixture of zirconia ($ZrO_2$) and silica ($SiO_2$) may be used. This modification has the advantage that, whereas in zircon the ratio of $ZrO_2$ to $SiO_2$ is fixed, it is possible to vary the ratio of zirconia to silica, as required. This may, in some instances, be particularly advantageous.

The present invention thus provides in a further aspect a process for the preparation of a ceramic material comprising a composite of zirconia and $O'$-/$\beta'$-sialon, which process comprises the reaction sintering at a temperature in the range of from 1500° to 1750° C. of a mixture of zirconia, silica, silicon nitride and alumina or a precursor therefor, optionally in the presence of a reaction sintering aid or a precursor therefor.

The reaction sintering aid, or the precursor therefor, used in this alternative embodiment of the invention is as hereinbefore described. Furthermore, the alumina for this process and the sintering aid may be provided by the use of a compound, e.g. a spinel as hereinbefore described.

BRIEF DESCRIPTION OF THE DRAWINGS

FIG. 4 is a plot of the strength of the material of Example 2 as a function of temperature; and FIG. 5 illustrates the oxidation resistance of the composition of Example 2 as compared to the composition of Example 3.

The present invention will be further described with reference to the following Examples.

EXAMPLE 1

The following compositions were ball milled for 24 hours under isopropanol, using a 3 mm zirconia mixing media. The slurry was pan dried and the powder isostatically pressed at 20,000 psi into billets.

The weight ratio of silicon nitride to zircon to alumina was kept approximately constant, whilst the yttria content was varied from zero to 6 percent by weight based on the zirconia. The billets were fired at 1700° C. for five hours in a carbon element furnace with a two hour rise time. The ratio of $O'$- to $\beta'$-sialon to zirconia was kept constant at 51:31:18 volume percent equivalent to 43:30:27 weight percent.

Composition A

| Silicon nitride | 52.0 g |
| Alumina | 8.8 g |
| Zircon | 39.2 g |

The fired billet had a density of 3.35 g.cm$^{-3}$ which is 92–95% of the theoretical density of 3.52–3.62 g.cm$^{-3}$.

Composition B

| Silicon nitride | 51.8 g |
| Alumina | 8.7 g |
| Zircon | 39.0 g |
| Yttria | 0.5 g (represents 2% by weight based on $ZrO_2$) |

The fired billet had a density of 3.33 g.cm$^{-3}$ which is 92–95% of the theoretical density of 3.52–3.62 g.cm$^3$.

Composition C

| Silicon nitride | 51.5 g |
| Alumina | 8.7 g |
| Zircon | 38.8 g |
| Yttria | 1.0 g (represents 4% by weight based on $ZrO_2$) |

The fired billet had a density of 3.28 g.cm$^{-3}$ which is 91–93% of the theoretical density of 3.52–3.62 g.cm$^{-3}$.

Composition D

| Silicon nitride | 51.2 g |
| Alumina | 8.6 g |
| Zircon | 38.6 g |
| Yttria | 1.6 g (represents 6% by weight based on $ZrO_2$) |

This composition was bloated and thus represents the upper limit of yttria addition possible for a firing temperature of 1700° C. It is probable that larger amounts of yttria can be used, providing that the firing temperature is reduced.

Figure 1:
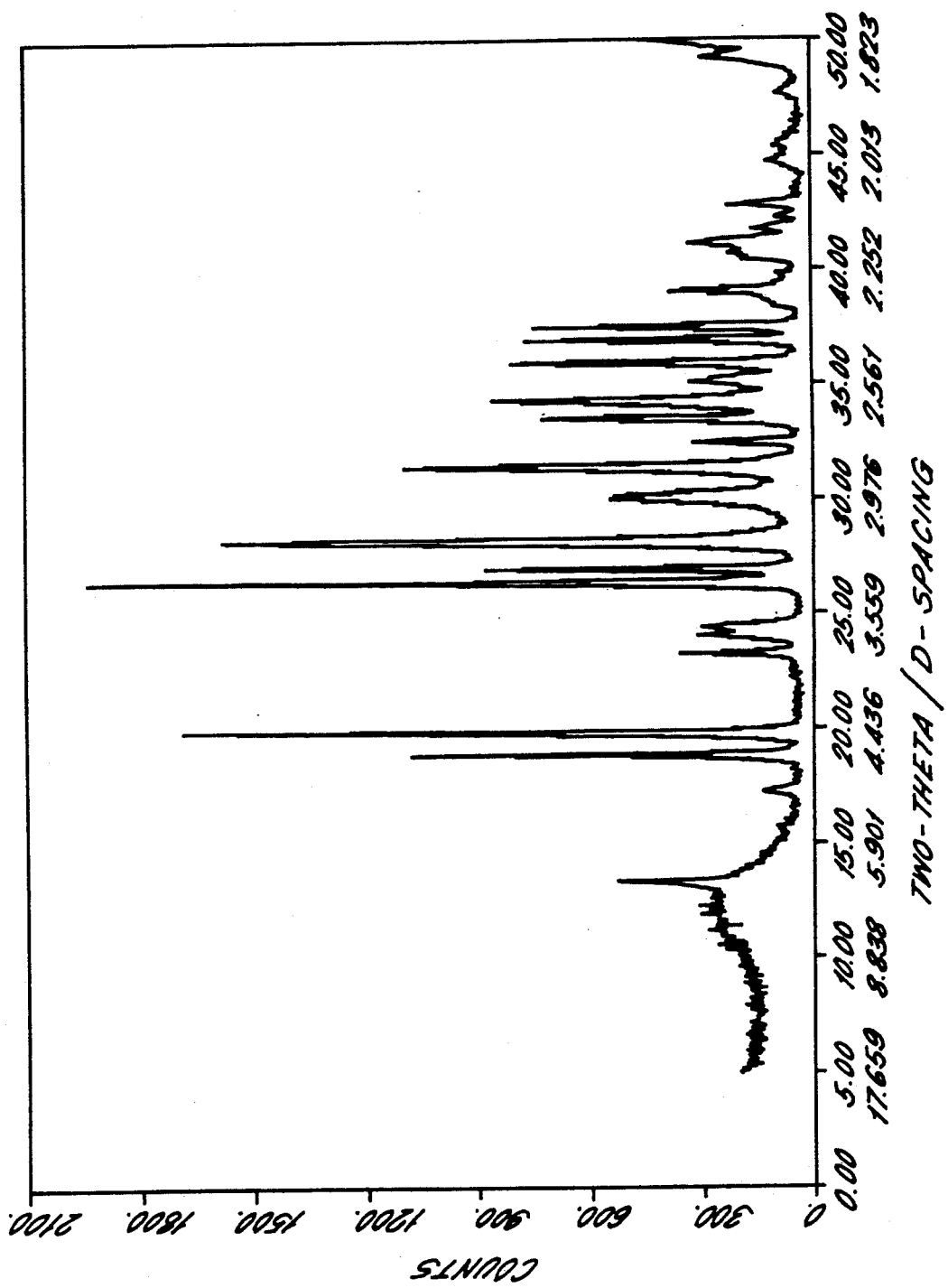
FIG. 1 is an X-ray diffraction trace for composition A of Example 1.

FIG. 1 is an X-ray diffraction trace for Composition A. The X-ray diffraction trace was taken with copper $K\alpha$ radiation. The trace shows only $O'$-sialon, $\beta'$-sialon and zirconia. There is a peak at 30° which is nitrogen stabilised cubic zirconia.

Figure 2:
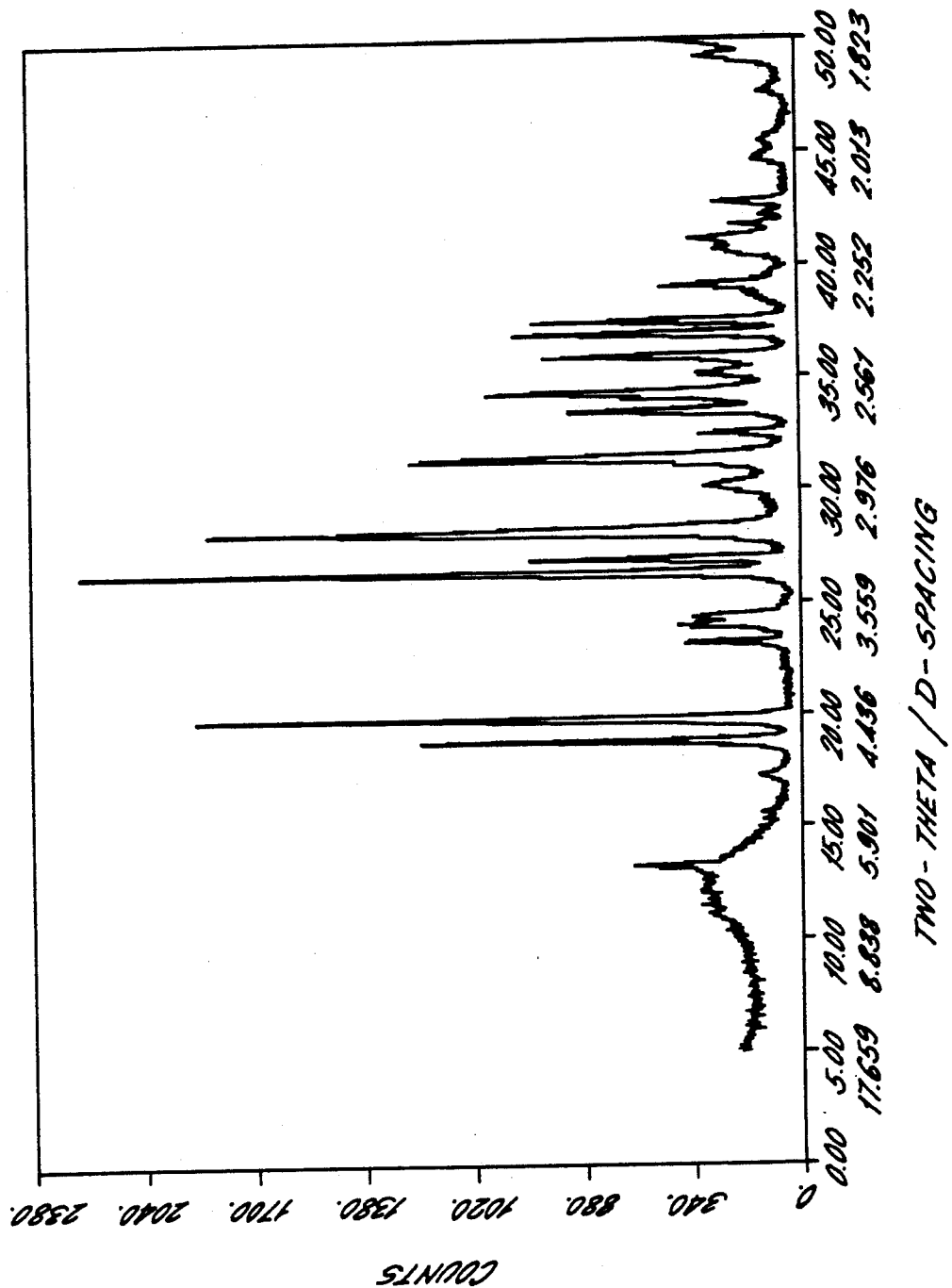
FIG. 2 is an X-ray diffraction trace for composition D of Example 1.
Figure 3:
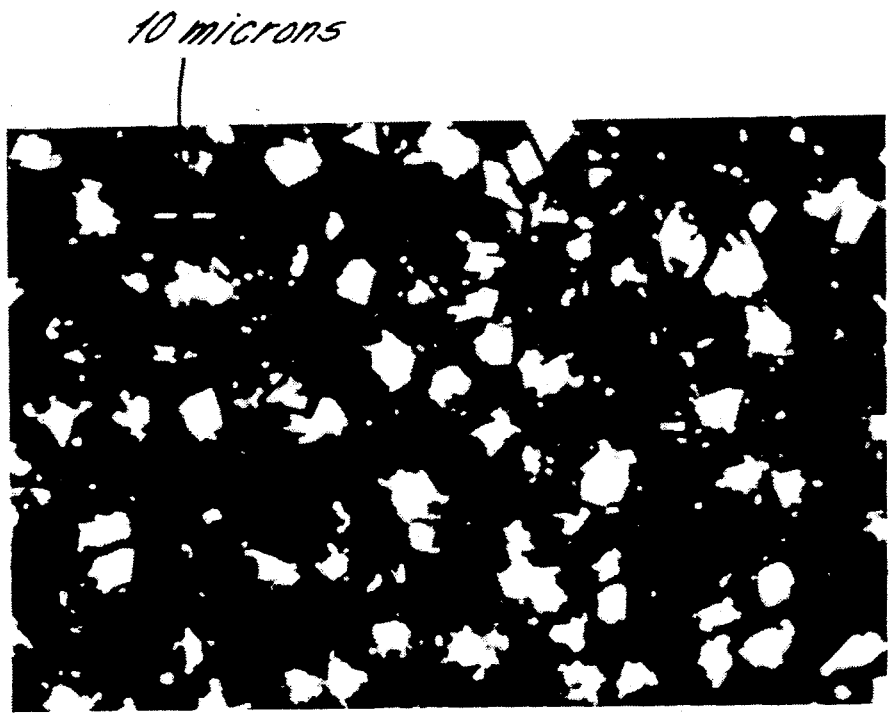
FIG. 3 is a scanning electron micrograph of composition D of Example 1.

An X-ray diffraction trace for Composition D is shown in FIG. 2. This shows both monoclinic and tetragonal zirconia with O'-sialon and β'-sialon. A scanning electron micrograph of the composition of this example at 2000 times magnification is shown in FIG. 3 and demonstrates the absence of grain boundary glass.

EXAMPLE 2

Zircon (38.5 g), silicon nitride (51.2 g), alumina (8.7 g) and neodymium oxide (1.6 g) were thoroughly mixed together and isostatically pressed at 20,000 psi. The billets were then fired at 1700° C. for 3 hours with a two hour rise time. The amount of neodymium oxide corresponds to 6 percent by weight based on the weight of the zirconia).

The fired density was 3.33 g/cm$^3$ which was 92–95% of the theoretical density of 3.52–3.62 g.cm$^3$.

The material had a room temperature strength of 336 MPa. The strength as a function of temperature is plotted in FIG. 4.

EXAMPLE 3 (COMPARATIVE)

Silicon nitride (60.1 g), alumina (10.1 g), silica (20.0 g) and yttria (9.8 g) were thoroughly mixed together and isostatically pressed at 20,000 psi. The billets were then fired at 1700° C. for 3 hours with a two hour rise time. The material comprised O'-sialon, β'-sialon and a glass. The material had a room temperature strength of 290 MPa. The strength as function of temperature is plotted in FIG. 4. This material shows as reduced strength at 1100° and 1200° C. as compared to the material of Example 2.

FIG. 5 illustrates the oxidation resistance of the composition of Example 2 as compared to the composition of Example 3. It can be seen from this Figure that the composite of zirconia and O'-/β'-sialon has a very much better oxidation resistance than the composite of this Example.

EXAMPLE 4

The following composition was ball milled for 24 hours under isopropanol, using a 3 mm zirconia mixing media. The slurry was pan dried and the powder isostatically pressed at 20,000 psi into billets.

| Silicon nitride | 58.9 g |
|---|---|
| Alumina | 10.9 g |
| Silica | 0.5 g |
| Zircon | 29.8 g |
| Magnesium oxide | 1.0 g |

The billets were fired at 1700° C. for 1 hour under nitrogen gas in a carbon resistance furnace.

The fired billet had a density of 3.33 g.cm$^{-3}$, which is 97–98% of the theoretical density of 3.39–3.42 g.cm$^{-3}$.

The weight ratio of O'- to β'-sialon to zirconia was 45:35:20.

X-ray diffraction analysis of the sample indicated from a peak at 30° that less than 2% of the zirconia was nitrogen stabilized cubic zirconia, the remainder of the zirconia was monoclinic.

EXAMPLE 5

The following composition was ball milled for 24 hours under isopropanol, using a 3 mm zirconia mixing media. The slurry was pan dried and the powder isostatically pressed at 20,000 psi into billets.

| Silicon nitride | 55.2 g |
|---|---|
| Alumina | 9.7 g |
| Silica | 5.4 g |
| Zircon | 29.7 g |
| Magnesium oxide | 1.0 g |

The billets were fired at 1700° C. for 1 hour under nitrogen gas in a carbon resistance furnace.

The fired billet had a density of 3.25 g.cm$^{-3}$, which is 97–98% of the theoretical density of 3.31–3.34 g.cm$^{-3}$.

The weight ratio of O'- to β'-sialon to zirconia was 60:20:20.

X-ray diffraction analysis of the sample indicated from a peak at 30o that less than 2% of the zirconia was nitrogen stabilized cubic zirconia, the remainder of the zirconia was monoclinic.

What is claimed is

1. A ceramic material which comprises a composite of zirconia and O'-/β'-sialon, the volume ratio of O'-sialon to β'-sialon being in the range of 1:7 to 7:1.

2. A ceramic material as claimed in claim 1, which comprises from 5 to 95 volume percent of zirconia, based on the total volume of the composition.

3. A ceramic material as claimed in claim 1 which comprises a dispersion of zirconia in an O'-/β'-sialon matrix.

4. A ceramic material as claimed in claim 3, which comprises from 5 to 30 volume percent of zirconia, based on the total volume of the composition.

5. A ceramic material as claimed in claim 1, wherein the composite includes therein a solid solution of zirconia with yttria, ceria, lanthanum oxide, calcium oxide, magnesium oxide or a rare earth metal oxide.

6. A ceramic material as claimed in claim 1, wherein the volume ratio of O'-sialon to β'-sialon is in the range of from 1:3 to 3:1.

* * * * *